United States Patent
Seo et al.

(10) Patent No.: US 11,509,722 B2
(45) Date of Patent: Nov. 22, 2022

(54) SERVER

(71) Applicant: LG ELECTRONICS INC., Seoul (KR)

(72) Inventors: Taemin Seo, Seoul (KR); Saehun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 17/014,369

(22) Filed: Sep. 8, 2020

(65) Prior Publication Data

US 2021/0075859 A1 Mar. 11, 2021

(30) Foreign Application Priority Data

Sep. 9, 2019 (KR) .................. 10-2019-0111642

(51) Int. Cl.
| | |
|---|---|
| *H04L 29/08* | (2006.01) |
| *H04L 15/16* | (2006.01) |
| *G06F 15/16* | (2006.01) |
| *G06Q 10/00* | (2012.01) |
| *G06Q 30/00* | (2012.01) |
| *G06K 9/62* | (2022.01) |
| *G06F 3/01* | (2006.01) |
| *G06N 3/08* | (2006.01) |
| *H04L 29/06* | (2006.01) |

(Continued)

(52) U.S. Cl.
CPC .............. *H04L 67/12* (2013.01); *G01W 1/00* (2013.01); *G06F 3/011* (2013.01); *G06K 9/6261* (2013.01); *G06N 3/08* (2013.01); *G06Q 10/20* (2013.01); *G06Q 30/016* (2013.01); *G06F 2203/011* (2013.01)

(58) Field of Classification Search
CPC .......... H04L 67/12; H04L 67/22; G01W 1/00; G06F 3/011; G06F 2203/011; G06K 9/6261; G06K 9/6256; G06N 3/08; G06N 3/0445; G06N 3/0454; G06N 20/00; G06Q 10/20; G06Q 30/016; G06Q 30/01; G06Q 30/0201
USPC ........................................................ 709/201
See application file for complete search history.

(56) References Cited

U.S. PATENT DOCUMENTS

| | | | | |
|---|---|---|---|---|
| 5,521,813 A | * | 5/1996 | Fox ................... | G06Q 10/06 |
| | | | | 705/7.29 |
| 10,042,548 B2 | * | 8/2018 | Matas ................ | G06T 11/60 |
| 10,593,350 B2 | * | 3/2020 | Liu .................... | G10L 15/26 |

(Continued)

FOREIGN PATENT DOCUMENTS

| | | | | |
|---|---|---|---|---|
| CN | 108874967 A | * | 11/2018 | ......... G06F 16/3329 |
| CN | 109067857 A | * | 12/2018 | ........... G06Q 10/047 |

(Continued)

*Primary Examiner* — David R Lazaro
*Assistant Examiner* — Berhanu Shitayewoldetadik
(74) *Attorney, Agent, or Firm* — Birch, Stewart, Kolasch & Birch, LLP

(57) ABSTRACT

Provided is a server. The server comprises a communicator configured to receive or transmit data from or to an external network and a processor configured to receive, through the communicator, service data of an electronic device, device data of the electronic device, and weather data for the electronic device and to calculate emotion index data based on the service data, the device data, and the weather data. Accordingly, customer's emotion index data may be efficiently calculated.

12 Claims, 12 Drawing Sheets

(51) Int. Cl.
    *H04L 67/12*      (2022.01)
    *G01W 1/00*       (2006.01)

(56)          References Cited

U.S. PATENT DOCUMENTS

| | | | | |
|---|---|---|---|---|
| 10,628,030 | B2* | 4/2020 | Matas | G06T 11/60 |
| 2004/0122753 | A1* | 6/2004 | Yap | H04N 21/6125 |
| | | | | 348/E5.002 |
| 2009/0150400 | A1* | 6/2009 | Abu-Hakima | H04L 67/55 |
| 2010/0042476 | A1* | 2/2010 | Gauri | G06Q 30/0601 |
| | | | | 705/7.29 |
| 2010/0246799 | A1* | 9/2010 | Lubowich | H04M 3/5175 |
| | | | | 379/265.09 |
| 2012/0046997 | A1* | 2/2012 | Pageler | G06Q 30/0201 |
| | | | | 705/7.33 |
| 2012/0122491 | A1* | 5/2012 | Kim | H04L 67/535 |
| | | | | 455/456.3 |
| 2015/0149461 | A1* | 5/2015 | Aguilar Lemarroy | G06F 16/35 |
| | | | | 707/737 |
| 2016/0328534 | A1* | 11/2016 | Kawai | A61B 5/1118 |
| 2016/0335401 | A1* | 11/2016 | Kawai | G16H 40/63 |
| 2016/0357402 | A1* | 12/2016 | Matas | G06Q 30/02 |
| 2017/0006135 | A1* | 1/2017 | Siebel | G06N 20/00 |
| 2017/0019320 | A1* | 1/2017 | Takaochi | H04L 41/5074 |
| 2017/0078621 | A1* | 3/2017 | Sahay | G06F 3/167 |
| 2018/0032126 | A1* | 2/2018 | Liu | G06F 3/011 |
| 2018/0341401 | A1* | 11/2018 | Matas | G06Q 50/01 |
| 2018/0350144 | A1* | 12/2018 | Rathod | H04W 4/021 |
| 2019/0034820 | A1* | 1/2019 | Manning | G06Q 50/26 |
| 2019/0073483 | A1* | 3/2019 | McClintock | G06F 21/554 |
| 2019/0087852 | A1* | 3/2019 | Blom | G06Q 30/0269 |
| 2019/0166540 | A1* | 5/2019 | Barak | G06Q 30/02 |
| 2019/0199584 | A1* | 6/2019 | Mueller | G06F 9/546 |
| 2019/0278786 | A1* | 9/2019 | Sherman | G06K 9/0055 |
| 2019/0325897 | A1* | 10/2019 | Liu | H04M 3/5175 |
| 2019/0384380 | A1* | 12/2019 | Woo | G06V 20/20 |
| 2020/0117690 | A1* | 4/2020 | Tran | G06F 16/90332 |
| 2020/0363220 | A1* | 11/2020 | Simoudis | G06Q 30/06 |
| 2020/0401382 | A1* | 12/2020 | Briggs | G06N 5/04 |

FOREIGN PATENT DOCUMENTS

| | | | | |
|---|---|---|---|---|
| EP | 3751466 A1 | * | 12/2020 | G06N 3/0445 |
| JP | 2020170333 A | * | 10/2020 | G06F 11/3055 |
| WO | WO-9416394 A2 | * | 7/1994 | G06Q 10/06 |
| WO | WO-2012143834 A1 | * | 10/2012 | A61B 5/165 |
| WO | WO-2015107743 A1 | * | 7/2015 | A47C 31/00 |
| WO | WO-2015107744 A1 | * | 7/2015 | A47C 31/00 |
| WO | WO-2016118979 A2 | * | 7/2016 | G06F 16/254 |
| WO | WO-2019067428 A1 | * | 4/2019 | G06F 11/321 |

* cited by examiner

FIG. 7B (a) | EMOTION SERVICE DATA | —722

(b) | CUSTOMER'S PRODUCT USAGE INFORMATION, OPERATION PATTERN INFORMATION OF DEVICE, AND VARIOUS SENSOR INFORMATION | —724

(c) | WEATHER DATA OF EACH CUSTOMER'S FIELD | —726

| CLASSIFICATION | USAGE MODE | TEMPERATURE SETTING | INDOOR TEMPERATURE | PIPE TEMPERATURE | ... |
|---|---|---|---|---|---|
| RECEPTION DATE | HEATING | 18°C | 24°C | 25°C | ... |
| REPAIR DATE | COOLING | 18°C | 27°C | 10°C | |

| CLASSIFICATION | USAGE MODE | TEMPERATURE SETTING | INDOOR TEMPERATURE | PIPE TEMPERATURE | ... |
|---|---|---|---|---|---|
| AVERAGE DIFFERENCE | X | 0 | 0 | 0 | ... |
| ... | | | | | |

| CLASSIFICATION | MODE | ... | PIPE TEMPERATURE | RESULT (LABELING) |
|---|---|---|---|---|
| RECEPTION DATE | HEATING | ... | 25°C | MISUSE OF MODE |
| REPAIR DATE | COOLING | ... | 10°C | NORMAL |

FIG. 8A

| SERVICE NUMBER | REPAIR CODE | EMOTION RISK INDEX | CUSTOMER SEG |
|---|---|---|---|
| ONE TIME | REPAIR | 0 | - |
| ONE TIME | EXPLAIN | 1 | GROUP A |
| TWO OR MORE TIMES | - | 2 | GROUP B |
| - | REFUND | 3 | GROUP C |

FIG. 8B

| CUSTOMER | SYMPTOM | CAUSE | ACTION | NUMBER OF CASES | EMOTION INDEX | CUSTOMER SEG |
|---|---|---|---|---|---|---|
| A | NOISE | NOT EMOTIONAL | EXPLAINED | 2 | 2 | B |
| B | NOISE | NOT REPRODUCIBLE | EXPLAINED | 1 | 1 | A |
| C | NOISE | NOT REPRODUCIBLE | REFUNDED | 1 | 3 | C |
| D | NOISE | NOT ASSEMBLABLE | ADJUSTED AND REPAIRED | 1 | 0 | - |

SERVER

CROSS-REFERENCE TO RELATED APPLICATION

This application claims the priority benefit of Korean Patent Application No. 10-2019-0111642, filed on, 9 Sep. 2019 in the Korean Intellectual Property Office, the disclosure of which is incorporated herein by reference.

BACKGROUND OF THE DISCLOSURE

1. Field of the Disclosure

The present disclosure relates to a server, and more particularly, to a server capable of efficiently calculating customer's emotion index data.

2. Description of the Related Art

Currently, there are frequent cases in which customer emotional complaints such as "not reproduced in the field" and "no abnormality in design specification" that occur in a customer service process are simply handled.

The same symptom occurs again after explanation, and in the end, a product is refunded with the problem unsolved, incurring an unnecessary service cost.

On-site data information is required at the time when a customer feels a problem to analyze this, but it is impossible to directly visit and collect data while waiting for the problem to arise.

Also, it is not possible to collect data by visiting a site of every customer each time a problem arises.

In addition, since service data and device data are currently operated separately on different servers or systems, a technology for integrating them to collect and process data is required.

SUMMARY OF THE DISCLOSURE

The present disclosure provides a server capable of efficiently calculating customer's emotion index data.

The present disclosure also provides a server capable of integrally managing service data, device data, and weather data.

In an aspect, a server comprises: a communicator configured to receive or transmit data from or to an external network; and a processor configured to receive, through the communicator, service data of an electronic device, device data of the electronic device, and weather data for the electronic device and to calculate emotion index data based on the service data, the device data, and the weather data.

The processor may perform learning based on the service data, the device data, and the weather data, and calculate emotion index data based on a learning result.

The processor may analyze a claim based on at least one of the service data, the device data, and the weather data, perform segmentation based on the claim, and calculate emotion index data based on the segmentation.

When performing segmentation, the processor may perform learning and calculate emotion index data based on a learning result.

The processor may extract customer information, area information, reception date information, repair date information, symptom information, and action information from the service data, extract device usage information, driving pattern information, and sensor information from the device data, and extract the weather data for the electronic device using the area information, the reception date information, and the repair date information.

The processor may extract service data matched to sensitivity from a plurality of service data, extract the number of occurrences due to the same symptom and the same cause based on the extracted service data, and calculate emotion index data based on the service data, the number of occurrences, and a service action.

The processor may extract service data matched to sensitivity from a plurality of service data, extract the number of occurrences due to the same symptom and the same cause based on the extracted service data, perform segmentation based on the service data, the number of occurrences, and a service action, and calculate emotion index data based on a segmentation result.

The processor may calculate sum index data based on the service data matched to sensitivity and the emotion index data.

The processor may integrally manage and analyze the service data, the device data, and the weather data for the electronic device.

The processor may provide usage result data of the electronic device, compare data of a service reception date and data of a repair date of the electronic device and provide a comparison result, provide significant difference analysis data between the reception date and the repair date, or provide failure cause information or result data predicted according to learning, based on an analysis result.

The processor may comprise: a data collector configured to, through the communicator, the service data of an electronic device, the device data of the electronic device, and the weather data for the electronic device; and a data processor configured to calculate the emotion index data based on the service data, the device data, and the weather data.

The data processor may integrally manage and analyze the service data, the device data, and the weather data for the electronic device.

The data processor may provide usage result data of the electronic device, compare data of a service reception date and data of a repair date of the electronic device and provide a comparison result, provide significant difference analysis data between the reception date and the repair date, or provide failure cause information or result data predicted according to learning, based on an analysis result.

The processor may comprise: a message generator configured to generate a usage guide message based on the usage result data, the failure cause information, or the result data; and an output information generator configured to generate output information based on the usage result data, comparison data based on the comparison of the data, the analysis data, the failure cause information, or the result data.

In another aspect, a server comprises: a communicator configured to receive or transmit data from or to an external network; and a processor configured to receive, through the communicator, service data of an electronic device and device data of the electronic device and to calculate emotion index data based on the service data and the device data.

The processor may perform learning based on the service data and the device data and calculate emotion index data based on a learning result.

The processor may analyze a claim based on at least one of the service data and the device data, perform segmentation based on the claim, and calculate the emotion index data based on the segmentation.

BRIEF DESCRIPTION OF THE DRAWINGS

The above and other objects, features and other advantages of the present disclosure will be more clearly understood from the following detailed description taken in conjunction with the accompanying drawings, in which:

FIGS. 6 to 8C are views referred to for description of the operation method of FIG. 5.

DETAILED DESCRIPTION OF THE PREFERRED EMBODIMENTS

Hereinafter, the present disclosure will be described in detail with reference to the accompanying drawings.

In the following description, usage of suffixes such as "module", "part" or "unit" used for referring to elements is given merely to facilitate explanation of the present invention, without having any significant meaning by itself. Therefore, the "module", "part" or "unit" may be used in combination.

Figure 1:
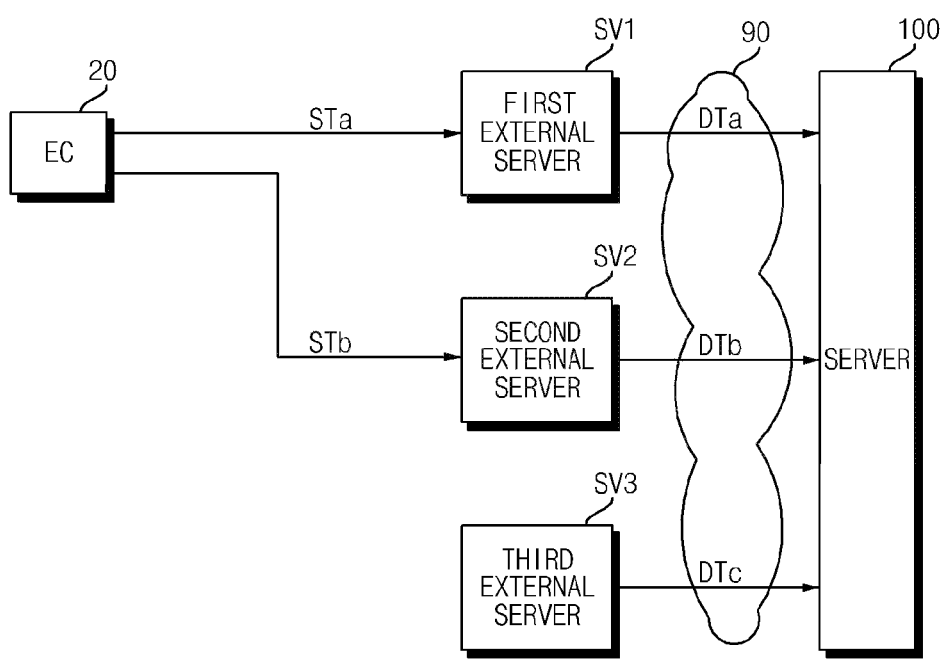
FIG. 1 is a view showing a customer emotion (customer sensitivity) calculation system according to an embodiment of the present disclosure.

FIG. 1 is a view illustrating a customer emotion (customer sensitivity) calculation system according to an embodiment of the present disclosure.

Referring to the drawing, a customer emotion calculation system 10 of FIG. 1 comprises an electronic device EC, a first external server SV1 receiving service data STa from the electronic device EC, a second external server SV2 receiving device data STb from the EC, a third external server SV3 providing weather data, and a server 100.

In order to integrally manage service data, device data, and weather data, the server 100 according to an embodiment of the present disclosure may be connected to the first eternal server SV1, the second external server SV2, and the third external server SV3 through a network 90.

Also, the server 100 according to an embodiment of the present disclosure may receive service data DTa, device data DTb, and the weather data DTc from the first external server SV1, the second external server SV2, and the third external server SV3, respectively.

Meanwhile, the electronic device EC in FIG. 1 may have a concept including a video display device (TV, monitor), a mobile terminal (smartphone, tablet, smart watch, etc.), a computer, a home appliance (refrigerator, washing machine, air conditioner, dryer, cooking equipment, air cleaner, robot cleaner, etc.), and a vehicle (car, drone, etc.).

Meanwhile, the server 100 according to an embodiment of the present disclosure may calculate emotion index data based on the service data DTa, the device data DTb, and the weather data DTc. Accordingly, it is possible to efficiently calculate customer's emotion index data.

Meanwhile, the server 100 according to an embodiment of the present disclosure may perform leaning based on the service data DTa, the device data DTb, and the weather data DTc and calculate emotion index data based on a learning result. Accordingly, it is possible to calculate accurate customer's emotion index data.

Meanwhile, the server 100 according to an embodiment of the present disclosure may analyze a claim based on at least one of the service data DTa, the device data DTb, and the weather data DTc, perform segmentation based on the claim, and calculate emotion index data based on the segmentation. Accordingly, it is possible to calculate accurate customer's emotion index data.

Meanwhile, the server 100 according to an embodiment of the present disclosure may perform learning when performing segmentation, and calculate emotion index data based on a learning result. Accordingly, it is possible to calculate accurate customer's emotion index data.

Meanwhile, the server 100 according to an embodiment of the present disclosure may extract customer information, area information, reception date information, repair date information, symptom information, and action information from the service data DTa, extract device usage information, driving pattern information, and sensor information from the device data DTb, and extract the weather data for the electronic device EC using the area information, the reception date information, and the repair date information. Accordingly, it is possible to efficiently calculate customer's emotion index data.

Meanwhile, the server 100 according to an embodiment of the present disclosure may extract the service data DTa matched to sensitivity from a plurality of service data DTa, extract the number of occurrences due to the same symptom and the same cause based on the extracted service data DTa, and calculate emotion index data based on the service data DTa, the number of occurrences, and a service action. Accordingly, it is possible to calculate accurate customer's emotion index data.

Meanwhile, the server 100 according to an embodiment of the present disclosure may extract service data DTa matched to sensitivity from a plurality of service data DTa, extract the number of occurrences due to the same symptom and the same cause based on the extracted service data DTa, perform segmentation based on the service data DTa, the number of occurrences, and a service action, and calculate emotion index data based on a segmentation result. Accordingly, it is possible to calculate accurate customer's emotion index data.

Meanwhile, the server 100 according to an embodiment of the present disclosure may calculate sum index data based on the service data DTa matched to sensitivity and the emotion index data. Accordingly, various data related to the customer may be calculated.

Meanwhile, the server 100 according to an embodiment of the present disclosure may integrally manage and analyze the service data DTa, the device data DTb, and the weather data DTc for the electronic device EC. Accordingly, the service data DTa, the device data DTb, and the weather data DTc may be integrally managed, so that accurate customer's emotion index data may be calculated.

Meanwhile, the server 100 according to an embodiment of the present disclosure may provide usage result data of the electronic device EC, compare data of a service reception date and data of a repair date of the electronic device EC and provide a comparison result, provide significant difference analysis data between the reception date and the repair date, or provide failure cause information or result data predicted according to learning, based on an analysis result. In this way, by providing various data, various applications may be made.

Meanwhile, the server 100 according to another embodiment of the present disclosure may receive the service data DTa of the electronic device EC and the device data DTb of the electronic device EC and calculate customer's emotion index data based on the service data DTa and the device data DTb. Accordingly, it is possible to efficiently calculate the customer's emotion index data.

Meanwhile, the server 100 according to another embodiment of the present disclosure may perform learning based on the service data DTa and the device data DTb and calculate emotion index data based on a learning result. Accordingly, it is possible to calculate accurate customer's emotion index data.

Meanwhile, the server 100 according to another embodiment of the present disclosure may analyze a claim based on at least one of the service data DTa and the device data DTb, perform segmentation based on the claim, and calculate emotion index data based on the segmentation. Accordingly, it is possible to calculate accurate customer's emotion index data.

Figure 2:
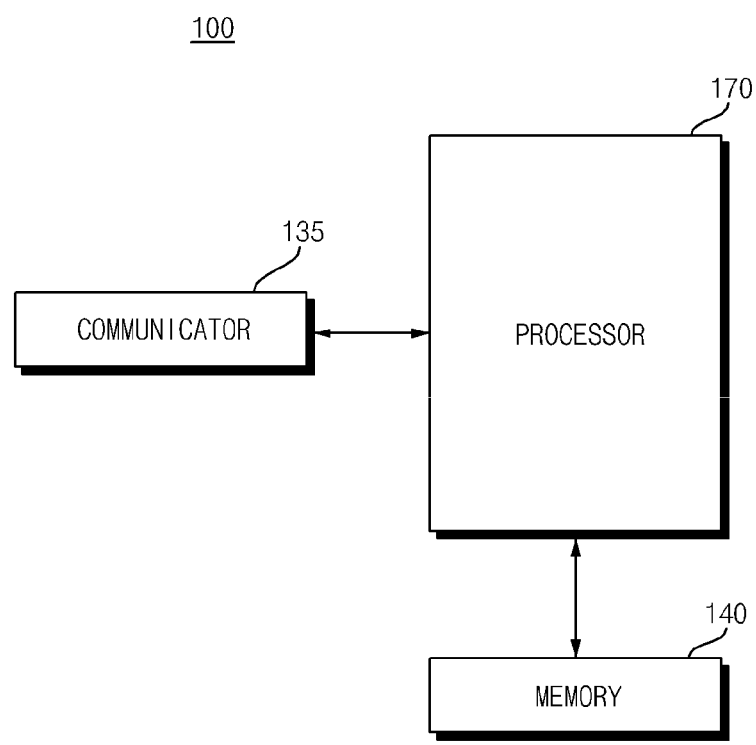
FIG. 2 is a simplified internal block diagram of a server of FIG. 1.

FIG. 2 is a simplified internal block diagram of the server of FIG. 1.

Referring to the drawing, the server 100 may comprise a communicator 135, a processor 170, and a memory 140.

The communicator 135 may receive or transmit data from or to the external network 90.

For example, the communicator 135 may receive service data DTa, the device data DTb, and the weather data DTc from the first external server SV1, the second external server SV2, and the third external server SV3, respectively.

The memory 140 may store data necessary for the operation of the server 100.

Figure 3:
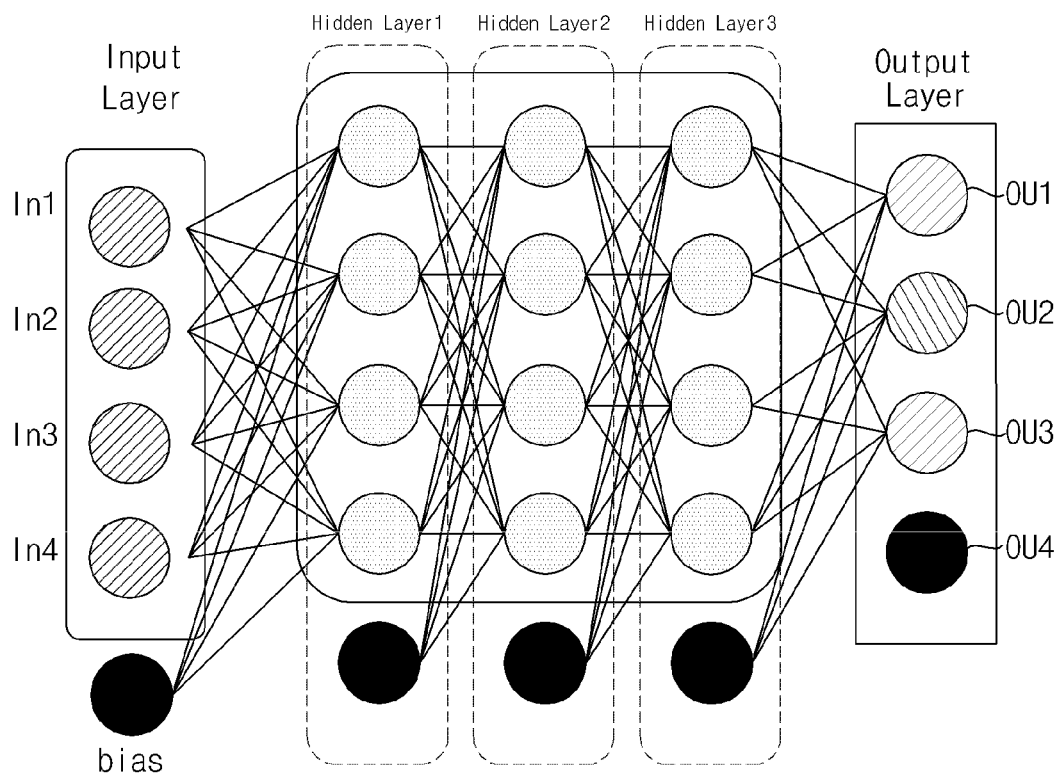
FIG. 3 illustrates an example of a deep neural network.

For example, the memory 140 may store a learning algorithm to be performed in the server 100. Here, the learning algorithm may be a deep neural network based learning algorithm as shown in FIG. 3.

Meanwhile, the processor 170 may perform an overall operation control of the server 100.

Meanwhile, the processor 170 may calculate emotion index data based on the service data DTa, the device data DTb, and the weather data DTc. Accordingly, it is possible to efficiently calculate customer's emotion index data.

Meanwhile, the processor 170 may perform learning based on the service data DTa, the device data DTb, and the weather data DTc, and calculate emotion index data based on a learning result. Accordingly, it is possible to calculate accurate customer's emotion index data.

Meanwhile, the processor 170 may analyze the claim based on at least one of the service data DTa, the device data DTb, and the weather data DTc, perform segmentation based on the claim, and calculate emotion index data based on the segmentation. Accordingly, it is possible to calculate accurate customer's emotion index data.

Meanwhile, when performing segmentation, the processor 170 may perform learning and calculate emotion index data based on a learning result. Accordingly, it is possible to calculate accurate customer's emotion index data.

Meanwhile, the processor 170 may extract customer information, area information, reception date information, repair date information, symptom information, and action information from the service data DTa, extract device usage information, driving pattern information, and sensor information from the device data DTb, and extract the weather data for the electronic device EC using the area information, the reception date information, and the repair date information. Accordingly, it is possible to efficiently calculate customer's emotion index data.

Meanwhile, the processor 170 may extract service data matched to sensitivity from a plurality of service data DTa, extract the number of occurrences due to the same symptom and the same cause based on the extracted service data DTa, and calculate emotion index data based on the service data DTa, the number of occurrences, a service action. Accordingly, it is possible to calculate accurate customer's emotion index data.

Meanwhile, the processor 170 may extract service data DTa matched to sensitivity from a plurality of service data DTa, extract the number of occurrences due to the same symptom and the same cause based on the extracted service data DTa, perform segmentation based on the service data DTa, the number of occurrences, and a service action, and calculate emotion index data based on a segmentation result. Accordingly, it is possible to calculate accurate customer's emotion index data.

Meanwhile, the processor 170 may calculate sum index data based on the service data DTa matched to sensitivity and the emotion index data. Accordingly, various data related to the customer may be calculated.

Meanwhile, the processor 170 may integrally manage and analyze the service data DTa, the device data DTb, and the weather data DTc for the electronic device EC. Accordingly, the service data DTa, the device data DTb, and the weather data DTc may be integrally managed, so that accurate customer's emotion index data may be calculated.

Meanwhile, the processor 170 may provide usage result data of the electronic device EC, compare data of a service reception date and data of a repair date of the electronic device EC and provide a comparison result, provide significant difference analysis data between the reception date and the repair date, or provide failure cause information or result date predicted according to learning, based on an analysis result. In this way, by providing various data, various applications may be made.

FIG. 3 illustrates an example of a deep neural network.

Referring to the drawing, the processor 170 may perform leaning to a deep level by multiple stages based on data through a deep learning technology, which is a type of machine learning.

Deep learning may represent a set of machine learning algorithms that extract key data from a plurality of data while sequentially passing through hidden layers.

The deep learning structure may comprise an deep neural network (DNN) such as an artificial neural network (ANN), a convolutional neural network (CNN), a recurrent neural network (RNN), or a deep belief network (DBN).

The deep neural network (DNN) may comprise an input layer, a hidden layer, and an output layer.

Meanwhile, having multiple hidden layers may be referred to as a deep neural network (DNN).

Each layer may comprise a plurality of nodes, and each layer may be associated with a next layer. Nodes may be connected to each other with a weight.

An output from a certain node belonging to a first hidden layer (Hidden Layer 1) is an input of at least one node belonging to a second hidden layer (Hidden Layer 2). Here, the input of each node may be a value obtained by applying a weight to an output of a node of a previous layer. Weight may refer to a connection strength between nodes. The deep learning process may also be seen as a process of finding an appropriate weight.

Figure 4:
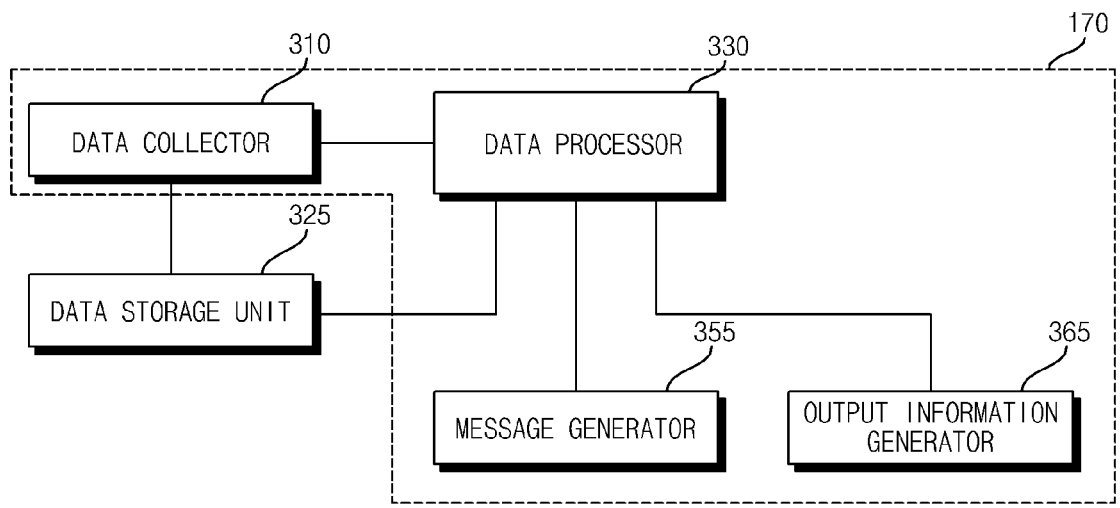
FIG. 4 illustrates an example of an internal block diagram of a processor of FIG. 2.

FIG. 4 is an example of an internal block diagram of the processor of FIG. 2.

Referring to the drawing, the processor 170 of FIG. 2 may comprise a data collector 310, a data processor 330, a message generator 355, and an output information generator 365.

Meanwhile, the memory 140 of FIG. 2 may comprise a data storage unit 325.

The data collector 310 may receive the service data DTa of the electronic device EC, the device data DTb of the electronic device EC, and the weather data DTc for the electronic device EC through the communicator 135.

In particular, the data collector 310 may receive the service data DTa, the device data DTb, and the weather data DTc from the first external server SV1, the second external server SV2, and the third external server (SV3), respectively.

The data processor 330 may calculate emotion index data based on the received service data DTa, the device data DTb, and the weather data DTc of the electronic device EC.

Meanwhile, the data processor 330 may perform learning based on the service data DTa, the device data DTb, and the weather data DTc and calculate emotion index data based on a learning result. Accordingly, it is possible to calculate accurate customer's emotion index data.

Meanwhile, the data processor 330 may analyze a claim based on at least one of the service data DTa, the device data DTb, and the weather data DTc, perform segmentation based on the claim, and calculate emotion index data based on the segmentation. Accordingly, it is possible to calculate accurate customer's emotion index data.

Meanwhile, when performing segmentation, the data processor 330 may perform learning and calculate emotion index data based on a learning result. Accordingly, it is possible to calculate accurate customer's emotion index data.

Meanwhile, the data processor 330 may extract customer information, area information, reception date information, repair date information, symptom information, and action information from the service data DTa, extract device usage information, driving pattern information, and sensor information from the device data DTb, and extract the weather data for the electronic device EC using the area information, the reception date information, and the repair date information. Accordingly, it is possible to efficiently calculate customer's emotion index data.

Meanwhile, the data processor 330 may extract service data DTa matched to sensitivity from a plurality of service data DTa, extract the number of occurrences due to the same symptom and the same cause based on the extracted service data DTa, and calculate emotion index data based on the service data DTa, the number of occurrences, a service action. Accordingly, it is possible to calculate accurate customer's emotion index data.

Meanwhile, the data processor 330 may extract service data matched to sensitivity from a plurality of service data DTa, extract the number of occurrences due to the same symptom and the same cause based on the extracted service data DTa, perform segmentation based on the service data DTa, the number of occurrences, and a service action, and calculate emotion index data based on a segmentation result. Accordingly, it is possible to calculate accurate customer's emotion index data.

Meanwhile, the data processor 330 may calculate sum index data based on the service data DTa matched to sensitivity and the emotion index data. Accordingly, it is possible to calculate various data related to the customer.

Meanwhile, the data processor 330 may integrally manage and analyze the service data DTa, the device data DTb, and the weather data DTc for the electronic device EC. Accordingly, the service data DTa, the device data DTb, and the weather data DTc may be integrally managed, so that accurate customer's emotion index data may be calculated.

Meanwhile, the data processor 330 may provide usage result data of the electronic device EC, compare data of a service reception date and data of a repair date of the electronic device EC and provide a comparison result, provide significant difference analysis data between the reception date and the repair date, or provide failure cause information or result date predicted according to learning, based on an analysis result. In this way, by providing various data, various applications may be made.

Meanwhile, the message generator 355 may generate a usage guide message based on the usage result data, the failure cause information, or the result data.

For example, when a customer misuses, message generator 355 may generate and output a usage guide message for correct use.

Specifically, the message generator 355 may generate and output a guide message such as "Weak cooling due to misuse of mode at the time of service reception is checked. Please take measures according to the following usage guide".

Meanwhile, the output information generator 365 may generate output information based on the usage result data, comparison data based on comparison of data, analysis data, failure cause information, or result data.

For example, the output information generator 365 may generate base information for field reproduction verification or provide design specification adjustment information of the electronic device EC.

As another example, the output information generator 365 may provide information regarding measures to be taken when a claim occurs again.

As another example, the output information generator 365 may provide an analysis result when a product or installation is a cause.

Figure 5:
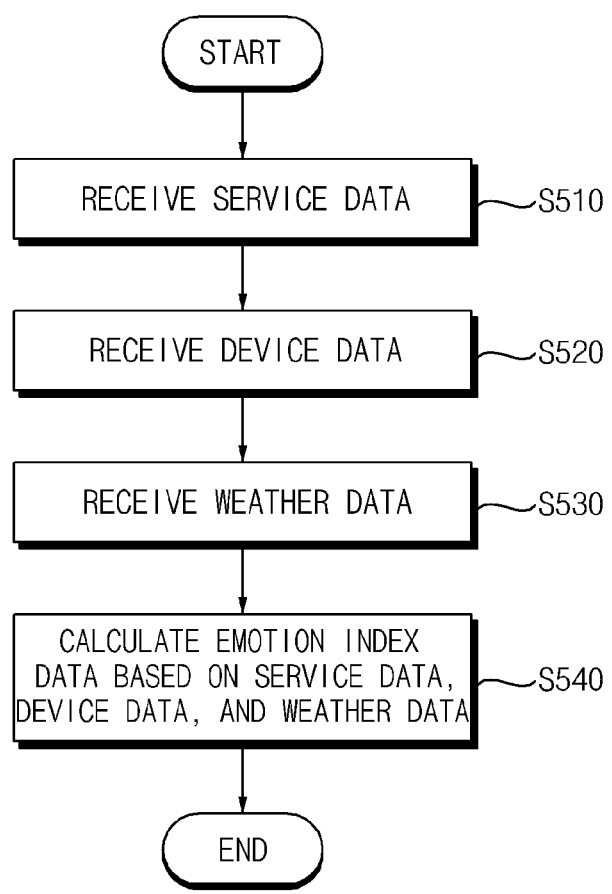
FIG. 5 is a flowchart illustrating a method of operating a server according to an embodiment of the present disclosure.

FIG. 5 is a flowchart illustrating an operation method of a server according to an embodiment of the present disclosure, and FIGS. 6 to 8C are views referred to for description of the operation method of FIG. 5.

First, referring to FIG. 5, the server 100 according to an embodiment of the present disclosure receives service data DTa from the first external server SV1 (S510).

The server 100 receives the device data DTb from the second external server SV2 (S520).

The server 100 receives weather data DTc from the third external server SV3 (S530).

Next, the server 100 may calculate emotion index data based on the service data DTa, the device data DTb, and the weather data DTc (S540). Accordingly, it is possible to efficiently calculate customer's emotion index data.

In particular, the processor 170 of the server 100, specifically, the data processor 330, may perform big data processing (S540).

Figure 6:
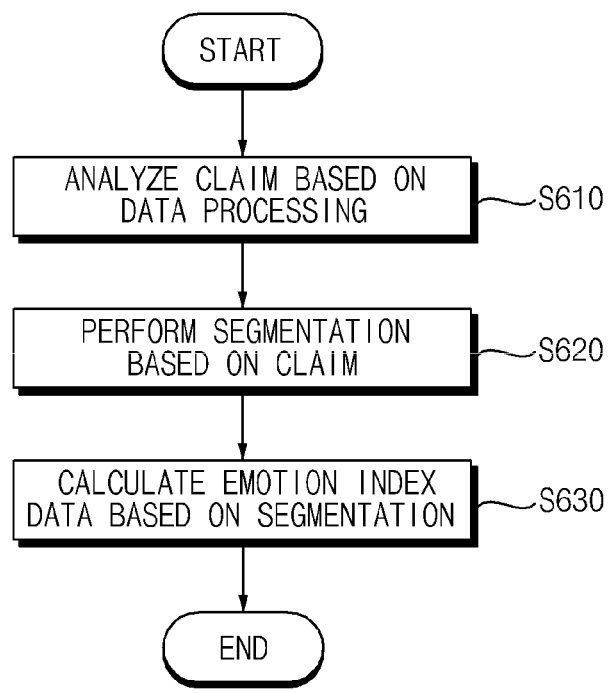

FIG. 6 is a view referred to for description of an operation of the data processor 330.

Referring to the drawing, the data processor 330 performs data processing on the service data DTa, the device data DTb, and the weather data DTc, and analyzes a claim based on the data processing (S610).

Figure 7A:
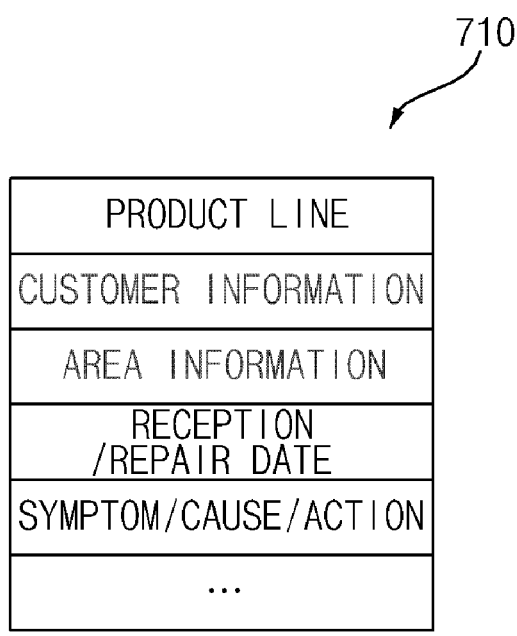

FIG. 7A is a view referred to for performing data processing on the service data DTa by the data processor 330.

Referring to the drawing, the service data 710 indicates information on after-sales service for the electronic device EC, and may comprise, in particular, product line information, customer information, area information, reception date Information, repair date information, a symptom, a cause, and action information.

Meanwhile, the data processor 330 may extract customer emotion service data 722 from the plurality of service data 710 as shown in FIG. 7B-(a).

The data processor 330 may extract the product line information, the customer information, the area information, the reception date Information, the repair date information, the symptom, the cause, and the action information from the service data 710 and analyze customer claim information based on the product line information, customer information, area information, reception date Information, repair date information, a symptom, a cause, and action information. Here, the customer claim information may be analyzed by learning.

Meanwhile, the data processor 330 may extract device usage information, driving pattern information, and sensor information 724 from the device data DTb as shown in FIG. 7B-(b).

Accordingly, the data processor 330 may extract the product line information, the customer information, the area information, the reception date Information, the repair date information, the symptom, the cause, and the action information and analyze the customer claim information based on the product line information, the customer information, the area information, the reception date Information, the repair date information, the symptom, the cause, the action information, the device usage information, the driving pattern information, the sensor information, and the like. Here, the customer claim information may be analyzed by learning.

Meanwhile, the data processor 330 may extract weather data 726 for the electronic device EC using the area information, the reception date information, and the repair date information as shown in FIG. 7-(c).

Accordingly, the data processor 330 may extract the product line information, the customer information, the area information, the reception date Information, the repair date information, the symptom, the cause, and the action information, and analyze the customer claim information based on the product line information, the customer information, the area information, the reception date Information, the repair date information, the symptom, the cause, the action information, the device usage information, the driving pattern information, the sensor information, and the weather information for the electronic device EC. Here, the customer claim information may be analyzed by learning. Accordingly, it is possible to accurately calculate customer claim information.

Figures 7C, 7D:
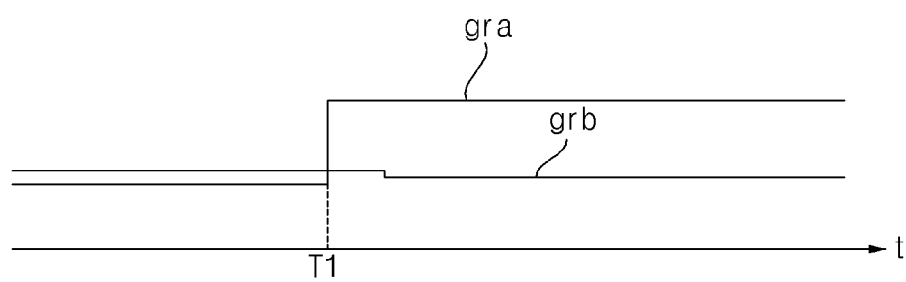

Meanwhile, FIG. 7C shows device usage information 732 of a customer.

Referring to the drawing, the customer's device usage information 732 may comprise usage mode information, temperature setting information, indoor temperature information, and pipe temperature information, which are usage information of an electronic device, in particular, an air conditioner.

In particular, the customer's device usage information 732 may comprise usage mode information, temperature setting information, indoor temperature information, and pipe temperature information according to a reception date and usage mode information, temperature setting information, indoor temperature information, and pipe temperature information based on a repair date.

FIG. 7D is a diagram illustrating analysis of trend of an electronic device according to service repair at time T1.

Gra represents a graph of an operation according to service repair, and Grb represents a graph of non-operation in spite of service repair.

Meanwhile, the data processor 330 may analyze significant difference analysis data between the reception date and the repair date and provide an analysis result. Here, it is possible to analyze the significant difference analysis data by learning.

FIG. 7E illustrates significant difference analysis data 734 between a reception date and a repair date.

Referring to the drawing, the significant difference analysis data 734 may comprise usage mode data, temperature setting data, indoor temperature data, pipe temperature data, and the like. The significant difference analysis data 734 may be classified by X and O depending on whether it is equal to or greater than an average difference. In the drawing, in particular, it is a significant difference of the usage mode data.

Meanwhile, the data processor 330 may provide the failure cause information or result data predicted according to learning.

FIG. 7F illustrates failure cause information 736.

Referring to the drawing, the failure cause information 736 may comprise mode information, pipe information, and result information corresponding to significant difference data for each of a reception date and a repair date.

In the drawing, result information of "mode misuse" is illustrated. Accordingly, it is possible to provide accurate failure cause information or result data.

Next, the data processor 330 performs segmentation based on customer claim information (S620).

Also, the data processor 330 calculates emotion index data based on the segmentation (S630).

Meanwhile, as shown in FIG. 8A, the data processor 330 may extract service data DTa matched to sensitivity from the plurality of service data DTa, extract the number of occurrences due to the same symptom and the same cause based on the extracted service data DTa, and perform segmentation based on the service data DTa, the number of occurrences, and a service action. Here, the segmentation may be performed according to learning.

Meanwhile, the data processor 330 may calculate the emotion index data according to the segmentation result. Accordingly, it is possible to calculate accurate customer's emotion index data 812.

FIG. 8B illustrates segmentation result data 814 for each customer.

Referring to the drawing, customer-specific segmentation result data 814 may comprise symptom data, cause data, action data, frequency data, customer segmentation data, and emotion index data of each customer.

In the drawing, it is illustrated that customer segmentation data A, B, and C have emotion index data 1 point, 2 points, and 3 points, respectively.

In this way, it is possible to calculate the accurate customer's emotion index data by calculating the emotion index data according to the segmentation result.

Meanwhile, the data processor 330 may calculate sum index data based on the service data DTa matched to sensitivity and emotion index data. Accordingly, various data related to the customer may be calculated.

Figure 8C:

FIG. 8C illustrates the sum index data 816.

Referring to the drawing, the sum index data 816 may be the sum of service index data corresponding to service data matched to sensitivity and calculated emotion index data.

In the drawing, the sum index data 816 is illustrated as 0.11, 0.07, 0.07, and 0.06, which is the sum of 0.05, 0.02, 0.07, and 0.05 of the service index data and 0.06, 0.05, 0.00, and 0.01 of the service index data, respectively. Accordingly, various data related to customers may be calculated.

Meanwhile, the processor 170 may provide usage result data of the electronic device EC, compare a service reception date and a repair date of the electronic device EC and provide a comparison result, provide a significant difference analysis data between the service reception date and the repair date of the electronic device EC, or provide failure cause information or result data predicted according to learning, based on an analysis result. Thus, various applications may be made by providing various data.

The server according to an embodiment of the present disclosure comprises: a communicator configured to receive or transmit data from or to an external network; and a processor configured to receive, through the communicator, service data of an electronic device, device data of the electronic device, and weather data for the electronic device and to calculate emotion index data based on the service data, the device data, and the weather data. Accordingly, it is possible to efficiently calculate customer's emotion index data.

Meanwhile, the processor may perform learning based on the service data, the device data, and the weather data, and calculate emotion index data based on a learning result. Accordingly, it is possible to calculate accurate customer's emotion index data.

Meanwhile, the processor may analyze a claim based on at least one of the service data, the device data, and the weather data, perform segmentation based on the claim, and calculate emotion index data based on the segmentation. Accordingly, it is possible to calculate accurate customer's emotion index data.

Meanwhile, when performing segmentation, the processor may perform learning and calculate emotion index data based on a learning result. Accordingly, it is possible to calculate accurate customer's emotion index data.

Meanwhile, the processor may extract customer information, area information, reception date information, repair date information, symptom information, and action information from the service data, extract device usage information, driving pattern information, and sensor information from the device data, and extract the weather data for the electronic device using the area information, the reception date information, and the repair date information. Accordingly, it is possible to efficiently calculate customer's emotion index data.

Meanwhile, the processor may extract service data matched to sensitivity from a plurality of service data, extract the number of occurrences due to the same symptom and the same cause based on the extracted service data, and calculate emotion index data based on the service data, the number of occurrences, and a service action. Accordingly, it is possible to calculate accurate customer's emotion index data.

Meanwhile, the processor may extract service data matched to sensitivity from a plurality of service data, extract the number of occurrences due to the same symptom and the same cause based on the extracted service data, perform segmentation based on the service data, the number of occurrences, and a service action, and calculate emotion index data based on a segmentation result. Accordingly, it is possible to calculate accurate customer's emotion index data.

Meanwhile, the processor may calculate sum index data based on the service data matched to sensitivity and the emotion index data. Accordingly, various customer related data may be calculated.

Meanwhile, the processor may integrally manage and analyze the service data, the device data, and the weather data for the electronic device. Accordingly, the service data, the device data, and the weather data may be integrally managed, so that accurate customer's emotion index data may be calculated.

Meanwhile, the processor provide usage result data of the electronic device, compare data of a service reception date and data of a repair date of the electronic device and provide a comparison result, provide significant difference analysis data between the reception date and the repair date, or provide failure cause information or result data predicted according to learning, based on an analysis result. In this way, by providing various data, various applications may be made.

Meanwhile, the processor may comprise: a data collector configured to, through the communicator, the service data of an electronic device, the device data of the electronic device, and the weather data for the electronic device; and a data processor configured to calculate the emotion index data based on the service data, the device data, and the weather data. Accordingly, it is possible to calculate accurate customer's emotion index data.

Meanwhile, the data processor may integrally manage and analyze the service data, the device data, and the weather data for the electronic device. Accordingly, the service data, the device data, and the weather data may be integrally managed, so that accurate customer's emotion index data may be calculated.

Meanwhile, the data processor may provide usage result data of the electronic device, compare data of a service reception date and data of a repair date of the electronic device and provide a comparison result, provide significant difference analysis data between the reception date and the repair date, or provide failure cause information or result data predicted according to learning, based on an analysis result. In this way, by providing various data, various applications may be made.

Meanwhile, the processor may comprise: a message generator configured to generate a usage guide message based on the usage result data, the failure cause information, or the result data; and an output information generator configured to generate output information based on the usage result data, comparison data based on the comparison of the data, the analysis data, the failure cause information, or the result data. In this way, various applications may be made by providing various data.

Meanwhile, the server according to another embodiment of the present disclosure comprises: a communicator configured to receive or transmit data from or to an external network; and a processor configured to receive, through the communicator, service data of an electronic device and device data of the electronic device and to calculate emotion index data based on the service data and the device data. Accordingly, it is possible to efficiently calculate customer's emotion index data.

Meanwhile, the processor may perform learning based on the service data and the device data and calculate emotion index data based on a learning result. Accordingly, it is possible to calculate accurate customer's emotion index data.

Meanwhile, the processor may analyze a claim based on at least one of the service data and the device data, perform segmentation based on the claim, and calculate the emotion index data based on the segmentation. Accordingly, it is possible to calculate accurate customer's emotion index data.

With the server described above, the configuration of the embodiments described above is not limited in its application, but all or some of the embodiments may be selectively combined to be configured to make various modifications.

Specific embodiments have been described but the present disclosure is not limited to the specific embodiments and various modifications may be made without departing from the scope of the present invention claimed in the claims, and such modifications should not be individually understood from technical concepts or prospects of the present disclosure.

What is claimed is:

1. A server comprising:
a transceiver configured to receive or transmit data from or to an external network; and
a processor configured to receive, through the transceiver, service data of an electronic device, device data of the electronic device, and weather data for the electronic device and to calculate emotion index data based on the service data, the device data, and the weather data,
wherein the service data is received from a first external server, the device data is received from a second external server, and the weather data is received from a third external server,
wherein the processor integrally manages and analyzes the service data, the device data, and the weather data for the electronic device,
wherein the processor provides usage result data of the electronic device, compares data of a service reception date and data of a repair date of the electronic device and provides a comparison result, provides significant difference analysis data between the reception date and the repair date, or provides failure cause information or result data predicted according to learning, based on an analysis result,
wherein the processor is configured to generate a usage guide message based on the usage result data, the failure cause information, or the result data,
wherein based on occurring misuse, the processor is configured to generate and output the usage guide message for correct use.

2. The server of claim 1, wherein the processor performs learning based on the service data, the device data, and the weather data, and calculates emotion index data based on a learning result.

3. The server of claim 1, wherein the processor analyzes a claim based on at least one of the service data, the device data, and the weather data, performs segmentation based on the claim, and calculates the emotion index data based on the segmentation.

4. The server of claim 3, wherein when performing segmentation, the processor performs learning and calculate the emotion index data based on a learning result.

5. The server of claim 1, wherein the processor extracts customer information, area information, reception date information, repair date information, symptom information, and action information from the service data, extracts device usage information, driving pattern information, and sensor information from the device data, and extracts the weather data for the electronic device using the area information, the reception date information, and the repair date information.

6. The server of claim 1, wherein the processor extracts service data matched to sensitivity from a plurality of service data, extracts the number of occurrences due to the same symptom and the same cause based on the extracted service data, and calculates the emotion index data based on the service data, the number of occurrences, and a service action.

7. The server of claim 1, wherein the processor extracts service data matched to sensitivity from a plurality of service data, extracts the number of occurrences due to the same symptom and the same cause based on the extracted service data, performs segmentation based on the service data, the number of occurrences, and a service action, and calculates the emotion index data based on a segmentation result.

8. The server of claim 1, wherein the processor calculates sum index data based on the service data matched to sensitivity and the emotion index data.

9. The server of claim 1, wherein the processor comprises:
a data collector configured to, through the transceiver, the service data of the electronic device, the device data of the electronic device, and the weather data for the electronic device; and
a data processor configured to calculate the emotion index data based on the service data, the device data, and the weather data.

10. The server of claim 9, wherein the data processor integrally manages and analyzes the service data, the device data, and the weather data for the electronic device.

11. The server of claim 10, wherein the data processor provides usage result data of the electronic device, compares data of a service reception date and data of a repair date of the electronic device and provides a comparison result, provides significant difference analysis data between the reception date and the repair date, or provides failure cause information or result data predicted according to learning, based on an analysis result.

12. The server of claim 11, wherein the processor comprises:
a message generator configured to generate a usage guide message based on the usage result data, the failure cause information, or the result data; and
an output information generator configured to generate output information based on the usage result data, comparison data based on the comparison of the data, the analysis data, the failure cause information, or the result data.

* * * * *